United States Patent
Del Fabro

(10) Patent No.: US 9,452,466 B2
(45) Date of Patent: Sep. 27, 2016

(54) APPARATUS TO FEED METAL PRODUCTS TO A WORK MACHINE AND CORRESPONDING METHOD

(71) Applicant: M.E.P. Macchine Elettroniche Piegatrici SpA, Reana del Rojale (IT)

(72) Inventor: Giorgio Del Fabro, Udine (IT)

(73) Assignee: M.E.P. Macchine Elettroniche Piegatrici SpA, Reana del Rojale (IT)

( * ) Notice: Subject to any disclaimer, the term of this patent is extended or adjusted under 35 U.S.C. 154(b) by 36 days.

(21) Appl. No.: 14/368,271

(22) PCT Filed: Dec. 20, 2012

(86) PCT No.: PCT/IB2012/002756
§ 371 (c)(1),
(2) Date: Jun. 23, 2014

(87) PCT Pub. No.: WO2013/093599
PCT Pub. Date: Jun. 27, 2013

(65) Prior Publication Data
US 2014/0356104 A1    Dec. 4, 2014

(30) Foreign Application Priority Data

Dec. 23, 2011 (IT) .............................. UD2011A0210

(51) Int. Cl.
| | |
|---|---|
| *B21F 23/00* | (2006.01) |
| *B21D 43/00* | (2006.01) |
| *B23Q 7/00* | (2006.01) |

(52) U.S. Cl.
CPC .............. *B21F 23/00* (2013.01); *B21D 43/00* (2013.01); *B21D 43/006* (2013.01); *B21F 23/005* (2013.01); *B23Q 7/00* (2013.01)

(58) Field of Classification Search
CPC .... B21F 23/00; B21F 23/005; B21F 23/007; B21D 43/00; B21D 43/006; B21D 43/08; B23Q 7/00
See application file for complete search history.

(56) References Cited

U.S. PATENT DOCUMENTS 3,893,357 A * 7/1975 Zahlaus ................ B21F 23/007
83/106

FOREIGN PATENT DOCUMENTS

| EP | 0419441 A1 | 3/1991 |
|---|---|---|
| EP | 1864726 A1 | 12/2007 |
| GB | 1436293 | 5/1976 |

OTHER PUBLICATIONS

International Search Report and Written Opinion from PCT/IB2012/002756,7 pages, (May 14, 2013).

*Primary Examiner* — Teresa M Ekiert
(74) *Attorney, Agent, or Firm* — Flaster/Greenberg PC

(57) ABSTRACT

An apparatus to feed metal products to a work machine comprising a plurality of feed heads disposed upstream of the work machine, each of which supporting the metal products, and at least one of which being configured to retain at least two metal products and render them selectively available to the work machine. The apparatus comprises a drawing unit interposed between the feed heads and the work machine, the drawing unit being configured to assume at least a first operating condition not interfering with the metal products, and a second operating condition in which it is positioned during use in axis with the work axis of the work machine and is configured to pick up from the feed head at least one of the metal products chosen from among the at least two metal products retained by the specific feed head and to feed it to the work machine in a direction of feed.

10 Claims, 6 Drawing Sheets

APPARATUS TO FEED METAL PRODUCTS TO A WORK MACHINE AND CORRESPONDING METHOD

BACKGROUND OF THE INVENTION

1. Field of the Invention

The present invention concerns an apparatus and a corresponding method to feed metal products such as reinforcement rods, section bars, tubes or suchlike, with any section shape whatsoever, to a work machine such as a stirrup-making machine, a bending machine, a shaping machine or other analogous or similar machine.

In particular, the apparatus according to the present invention is disposed upstream of the work machine and is provided with a plurality of feed heads, each of which is provided to retain the ends of the metal products arriving, for example, from a respective coil. The apparatus is provided to feed to the work machine the metal products of one of the feed heads.

2. Description of Related Art

Work machines are known, for bending, shaping and stirrup-making of metal products such as bars, round pieces, reinforcement rods or suchlike. Examples of such machines are described in EP 1.864.726 A1, GB 1.436.293 A and EP 419.441 A1.

It is also known that such work machines are provided upstream of the work members, for example bending mandrels and cutting shears, with drawing means provided to move the metal products longitudinally.

To increase the versatility of the work machines, upstream of the latter an apparatus may be provided to feed the metal products which, according to requirements, makes available to the machine the different metal products required for the particular type of final product to be obtained. The feed apparatus is therefore suitable to predispose metal products having different geometrical properties such as different sizes or different section shapes.

A feed apparatus is known, provided with a plurality of feed heads, each of which is suitable to retain the ends of one or more metal products to be worked simultaneously, and a drawing unit, or insertion unit, which is disposed in axis with the drawing means of the machine to feed the products to the work machine, thus allowing for example the drawing means comprised inside the machine itself to grip.

More specifically, the metal products are moved, by means of suitable conveyor means, toward the feed heads which retain the respective ends The feed heads are each taken, on each occasion and according to the specifications of the final product to be obtained, into correspondence with the drawing unit of the machine, which then moves the corresponding metal products longitudinally toward the work members.

To increase the productivity of these machines it is also known that each of the feed heads is provided with two or more positioning seatings, for each type, to feed two or more metal products simultaneously to the work machine.

One disadvantage of known feed apparatuses is the limited flexibility in the frequent case where the machine has to work one product only, or two or more products of the same type.

BRIEF SUMMARY OF THE INVENTION

One purpose of the present invention is to obtain an apparatus to feed metal products that is efficient and that allows to adapt to the specific production requirements without entailing operating delays.

Another purpose of the present invention is to obtain a machine that is simple and economical to make, and at the same time does not introduce design complexities to the management of the machine.

The Applicant has devised, tested and embodied the present invention to overcome the shortcomings of the state of the art and to obtain these and other purposes and advantages.

The present invention is set forth and characterized in the independent claims, while the dependent claims describe other characteristics of the invention or variants to the main inventive idea.

In accordance with the above purposes, an apparatus to feed metal products to a work machine comprises a plurality of feed heads disposed upstream of the work machine, each of which is suitable to support metal products having different characteristics, such as different sizes and shapes of their cross section, with respect to the adjacent feed heads.

The feed heads are disposed on each occasion in correspondence with the axis of feed of the metal products in the work machine, depending on the specifications that each of the final products must have.

In order to increase the productivity of the machine, at least some of the feed heads are configured to retain at least two of the metal products of the same type and to make them selectively available to the work machine so that the processes required can be carried out simultaneously.

According to a feature of the present invention, the apparatus also comprises a drawing unit, or insertion unit, interposed between the feed heads and the work machine, which is configured to assume at least a first operating condition not interfering with the metal products, and a second operating condition in which it is positioned in axis with the axis of work of the machine located downstream to pick up from the individual feed head at least one of the metal products chosen from among the at least two metal products retained by the feed head and feed it to the machine in a direction of feed.

In this way, in the first operating condition the drawing unit does not interfere with the movements of the feed heads, which can be selectively moved to dispose one of them in correspondence with the entrance to the machine. In the second operating condition on the contrary, the drawing unit can pick up from one of the feed heads, selectively, any one whatsoever of the metal products predisposed by it, thus increasing the versatility of the work machine. It will therefore be possible to choose which of the products of one and each of the feed heads to move, depending on the specific requirements dictated, for example, by the residual quantity of metal products present upstream of the apparatus, by the specific production requirements or by the particular type of metal product.

According to another feature, the drawing unit is associated with a slider that is selectively translatable on sliding guides in a first direction, transverse to the direction of feed of the metal products, so as to selectively take the drawing unit to the first and second operating conditions. To this end suitable movement means may be provided, such as oil-dynamic or pneumatic actuators, jacks with screws or suchlike, to perform said translation.

According to another feature, the drawing unit comprises a motorized roller and a contrast roller both associated with the slider, at least one of which is selectively movable toward the other so as to exert a contrasting action on at least one of the metal products, and allow it to advance.

According to one form of embodiment, an interspace is provided between the slider and at least one of either the motorized roller or the contrast roller. In the second operating feed condition, the interspace prevents the metal product that is not being fed at that moment to the machine from interfering with the drawing unit. This form of embodiment is advantageous to allow to feed any one whatsoever of the two or more metal products associated simultaneously with the individual feed head.

The present invention also concerns the work machine that comprises a feed apparatus as described above.

Furthermore, the invention also concerns the corresponding method to feed metal products to a work machine according to the description given above.

BRIEF DESCRIPTION OF THE SEVERAL VIEWS OF THE DRAWINGS

These and other characteristics of the present invention will become apparent from the following description of some forms of embodiment, given as a non-restrictive example with reference to the attached drawings wherein.

Figure 1:
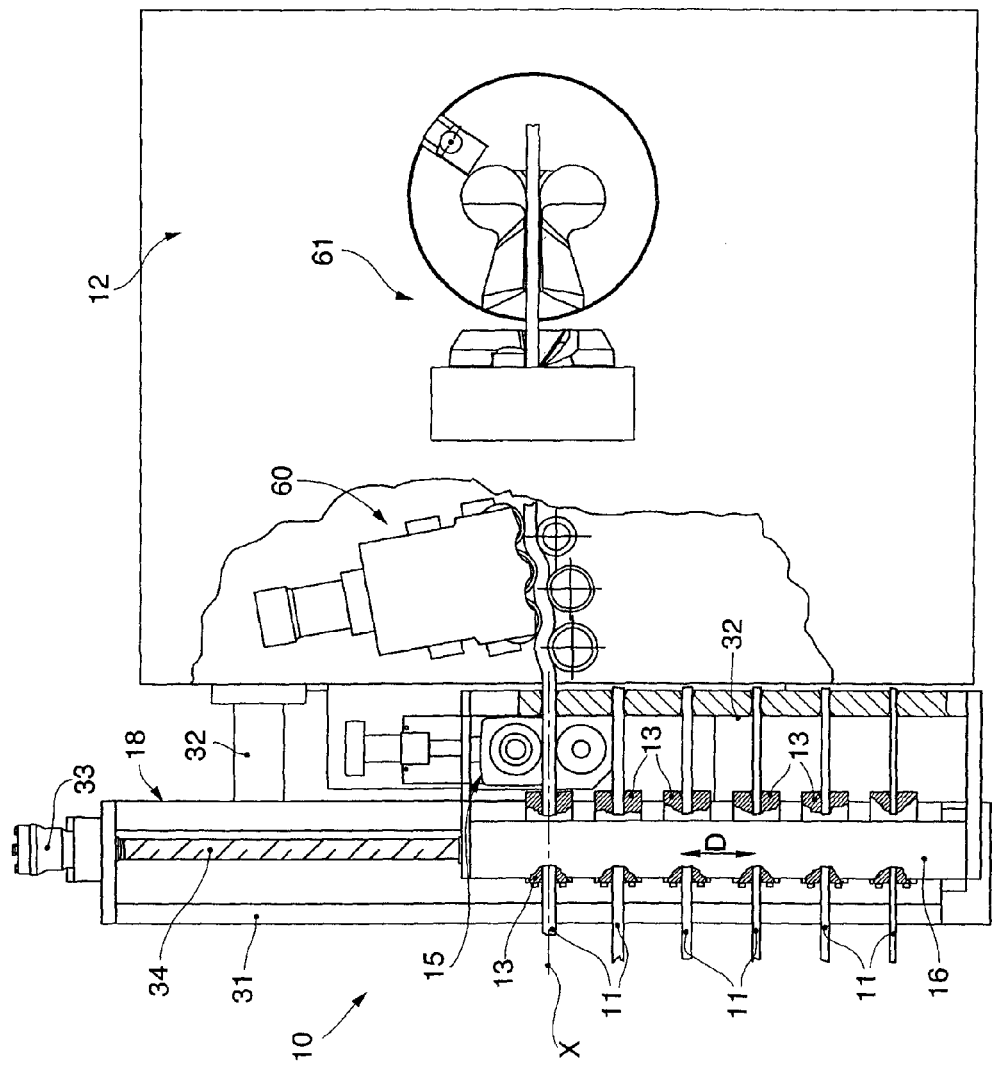
FIG. 1 is a plan view of an apparatus to feed metal products according to the present invention applied to a work machine.
Figure 2:
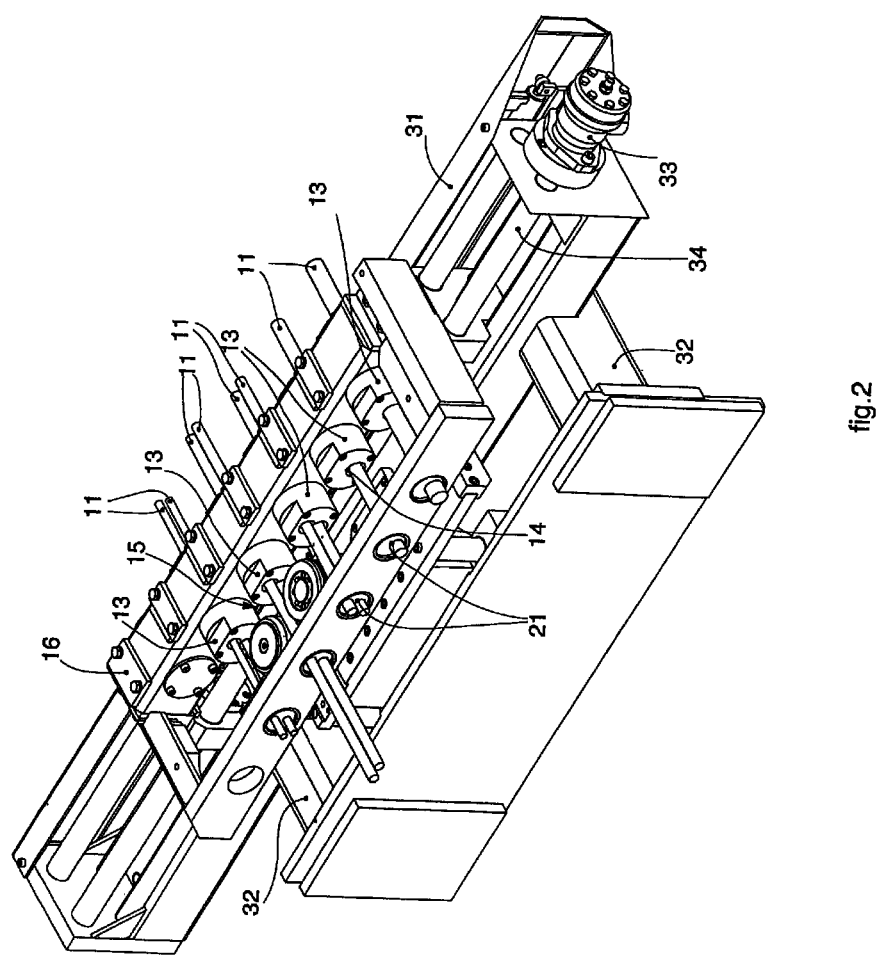
FIG. 2 is a perspective view of an apparatus to feed metal products according to the present invention.

To facilitate comprehension, the same reference numbers have been used, where possible, to identify identical common elements in the drawings. It is understood that elements and characteristics of one form of embodiment can conveniently be incorporated into other forms of embodiment without further clarifications.

DETAILED DESCRIPTION OF THE INVENTION

With reference to FIGS. 1-5, an apparatus to feed metal products 11 according to the present invention is indicated in its entirety by the reference number 10 and is disposed upstream of a work machine, in this case a bending machine 12 shown schematically.

The feed apparatus 10 is provided to feed, in a direction of feed X, a plurality of metal products 11, hereafter indicated by the generic name of bars, with different shapes and cross section sizes.

The feed apparatus 10 (FIGS. 1-3) comprises a support frame 18 to which a plurality of feed heads 13 are associated, in this case six feed heads 13, and a drawing unit 15, or insertion unit, which provides to pick up the metal products 11 from one of the feed heads 13 and to feed them to the bending machine 12.

The bars 11 are normally taken from corresponding coils in which they are wound and, by means of suitable conveying means, are conveyed toward the feed apparatus 10 to be inserted through passage channels 14 (FIG. 3) present in the feed heads 13.

The feed heads 13 are mounted on a support body 16 which is suitably moved in a transverse direction D with respect to the direction of feed X of the bars 11, according to the type of product to be fed.

A plate 19 is solidly associated by means of brackets 17 to the support body 16 and is interposed between the machine 12 and the support body 16. The plate 19 is provided with a plurality of through holes 21, each of which is of a shape and size such as to allow the insertion through them of the bars 11 arriving from the respective feed heads 13.

The through holes 21 (FIGS. 4-5) are disposed with their respective centers aligned according to an axis R orthogonal to the plane on which the feed heads 13 lie and orthogonal to their direction of feed X.

The through holes 21 are made in positions and with sizes mating with the passage channels 14 present in the feed heads 13 of the bars 11.

In some forms of embodiment, it may be provided that wear resistant elements are associated with the plate 19, in which elements the through holes 21 are made. This is advantageous given that the through holes 21 are subjected to a great deal of wear due to the bars 11 sliding across them.

Each of the feed heads 13 (FIG. 5) is provided with gripping devices 23, suitable to grip and constrain the movement of the bars 11 in normal use.

Each of the gripping devices 23 in this case comprises actuators 25, each of which is configured to act on a respective holding element 26 which in normal use keeps the bars 11 constrained in their movement.

During the movement of the support body 16, the gripping devices 23 prevent the bars 11 from coming out of the passage channels 14 and the through holes 21.

By activating the actuators 25, the holding elements 26 are released and they in turn release the bars 11, allowing them to subsequently move toward the bending machine 12.

The support frame 18 (FIG. 3) comprises a box 31 with a substantially rectangular shape which is mounted by means of supporting brackets 32 on the bearing structure of the bending machine 12.

A drive member 33 is associated with the box 31, provided to make a worm screw 34 rotate, which in turn is connected to the support body 16. In particular, by actuating the drive member 33 the support body 16 is translated by the worm screw 34 in said direction D transverse to the direction of feed X of the bars 11.

Figure 3:
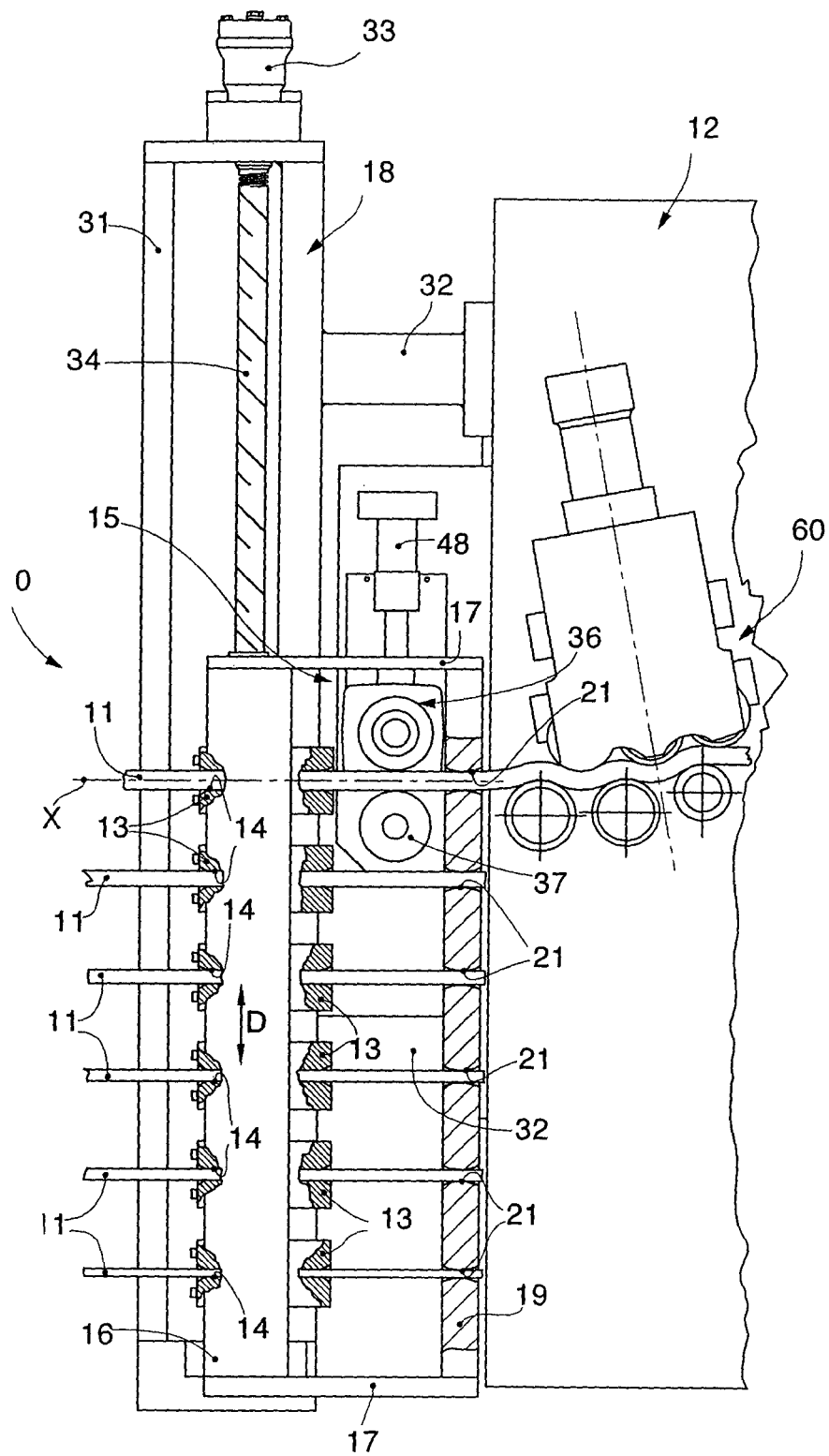
FIG. 3 is a plan view of the apparatus according to the present invention.
Figure 4:
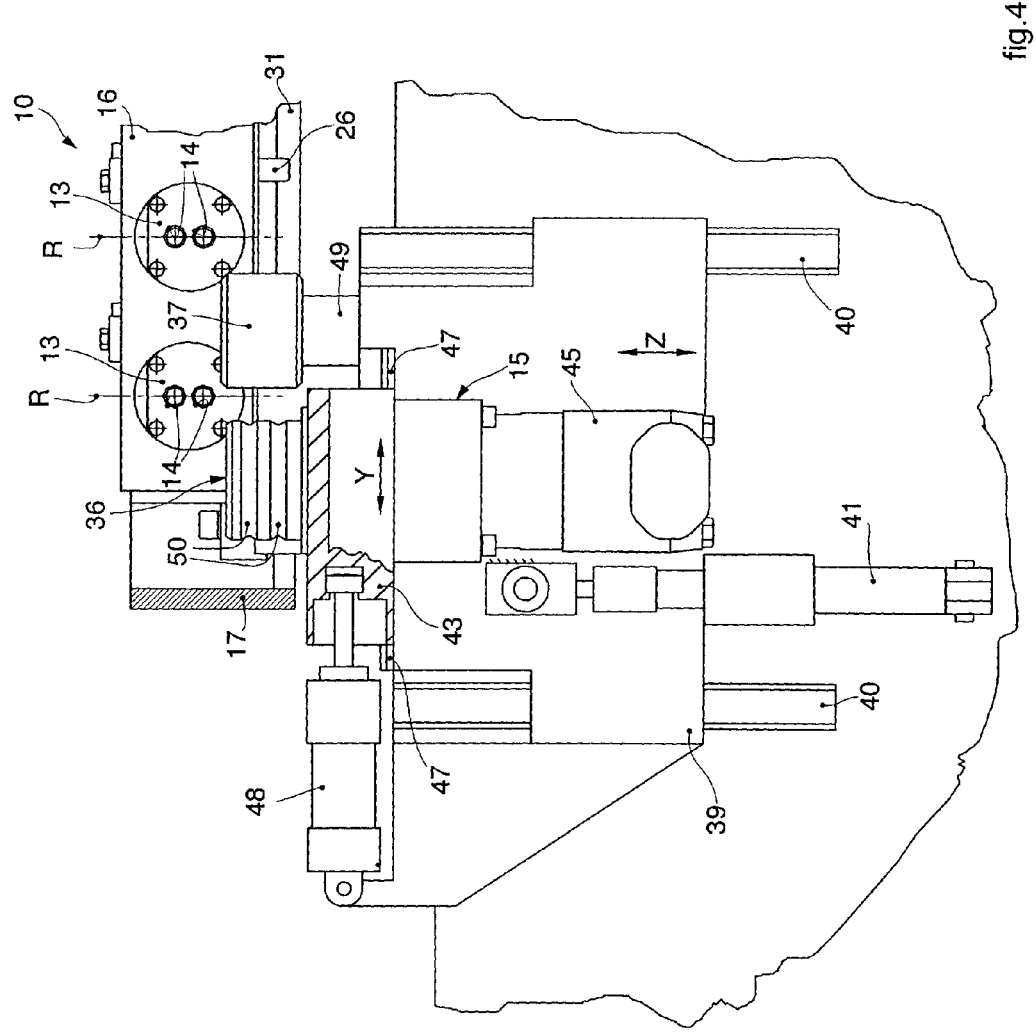
FIG. 4 is a lateral view of a detail of FIG. 3.
Figure 5:
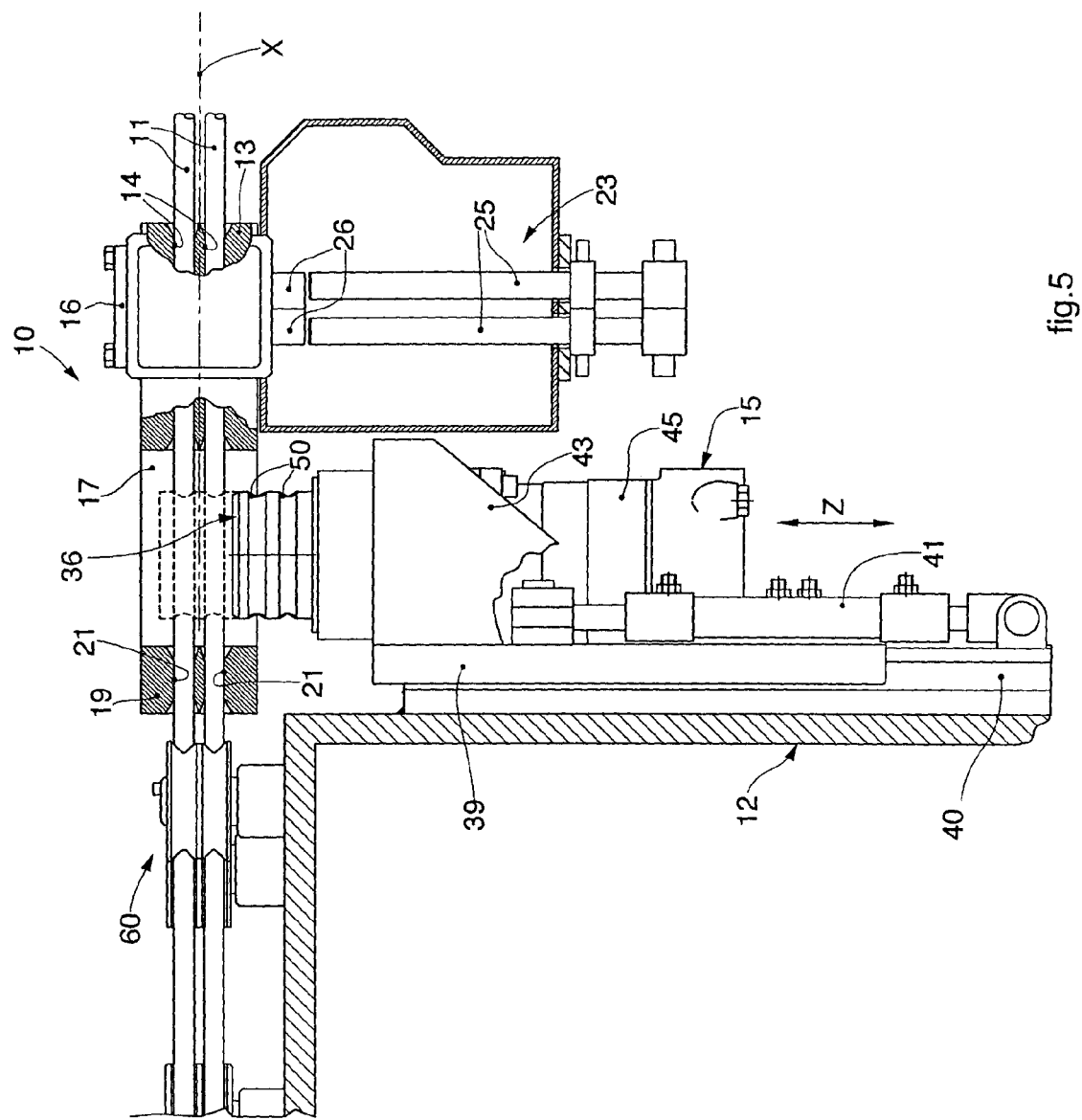
FIG. 5 is a front view of the detail of FIG. 4.

The drawing unit 15 comprises a motorized roller 36 and a contrast roller 37, mounted idle and disposed adjacent to the motorized roller 36 (FIG. 3).

The drawing unit 15 is selectively movable in a first direction Z (FIGS. 4 and 5) substantially orthogonal to the direction of feed X of the bars 11 and to the transverse direction D of movement of the support body 16. In particular, the drawing unit 15 is mounted on a slider 39 sliding on longitudinal guides 40, which are mounted fixed to the body of the machine 12.

A first actuator 41 is associated on one side to the body of the machine 12 and on the other to the slider 39, in order to translate the latter.

A support element 43 is associated with the slider 39 and a motor 45 is mounted on it, provided to make the motorized roller 36 rotate.

The slider 39 is provided with transverse guides 47 (FIG. 4) disposed orthogonal to the longitudinal guides 40 to allow the support element 43 to slide in a second direction Y orthogonal to the first direction Z.

A second actuator 48 is associated respectively to the slider 39 and the support element 43 to allow the latter to slide along the transverse guides 47.

A pin 49 is mounted on the slider 39, and the idle contrast roller 37 is mounted on it.

In this way, by actuating the first actuator 41 it is possible to move the slider 39 and hence solidly both the motorized roller 36 and the idle contrast roller 37 in the first direction Z, whereas by actuating the second actuator 48 the motorized roller 36 is moved from and toward the idle contrast roller 37 in the second direction Y.

The motorized roller 36 is provided on its external surface with a plurality of grooves 50, corresponding in number to that of the bars 11 which each feed head 13 is able to retain.

The drawing unit 15 (FIG. 5) can therefore assume a first operating condition in which it is disposed under the feed plane of the bars 11, so that the movement of the support body 16 does not generate any interference between the bars 11 and the drawing unit 15, and a second operating condition (shown by dotted lines in FIG. 5), in which it is translated to cooperate with the bars 11 of one of the feed heads 13 that have to be fed to the machine 12. In the second operating condition, the drawing unit 15 is configured to feed to the machine at least one of the bars 11 that are retained by the feed head 13.

More specifically, in the second operating condition, the grooves 50 of the motorized roller 36 are disposed in correspondence with the axis of the bars 11 and move the latter by a contrasting action of the idle contrast roller 37 on the motorized roller 36.

Figure 7:
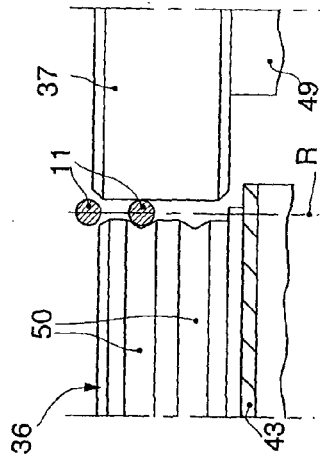
FIG. 7 is a view of the detail of FIG. 6 in a second operating condition.
Figure 6:
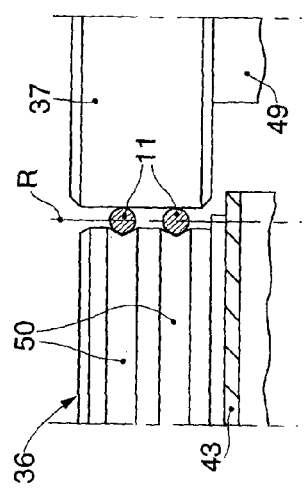
FIG. 6 is a schematic representation of a detail of FIG. 4 in a first working condition.
Figure 8:
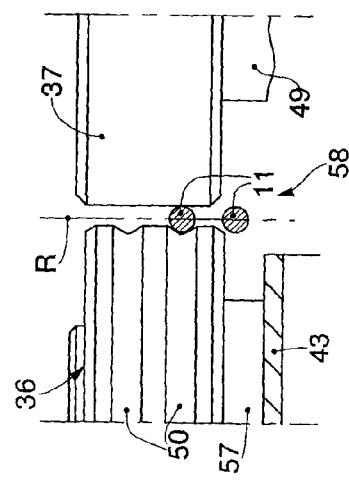
FIG. 8 is a view of a first variant of FIG. 7.

In the second operating condition, the motorized roller 36 can be disposed so as to contact with its grooves 50 all the bars 11 (FIG. 6), or so as to contact only one of the bars 11 (FIGS. 7 and 8).

In this latter case, the drawing unit 15 is translated in the first direction Z, so that the motorized roller 36 contacts only one of the bars 11, for example the innermost one (FIG. 7).

In another form of embodiment (FIG. 8), it may be provided that the motorized roller 36 is suitable to move the bar 11 which is disposed outermost. In this case, the motorized roller 36 and the idle contrast roller 37 are mounted respectively on a rotation shaft 57 and on the above-mentioned pin 49, distanced from the support element 43, so that the bar 11, which is disposed innermost, does not interfere with parts of the support element 43. In this form of embodiment, an interspace 58 is defined between the support element 43 and the motorized roller 36 which prevents said conditions of interference.

Figure 9:
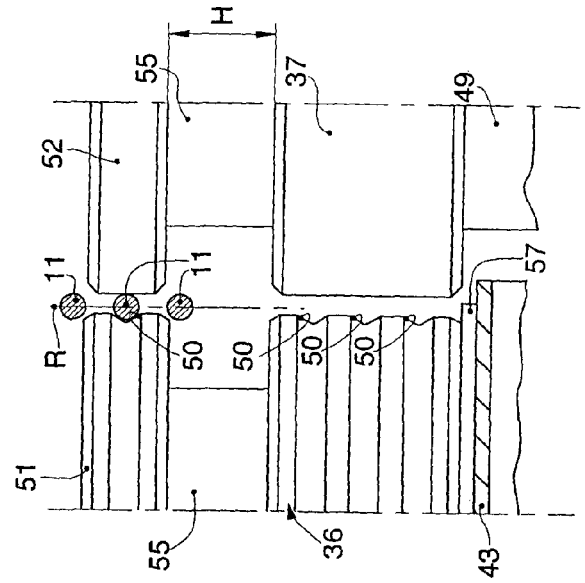
FIG. 9 is a view of a second variant of FIG. 7.

According to another form of embodiment (FIG. 9), it may be provided that a first auxiliary roller 51 and a second auxiliary roller 52 are associated respectively to the motorized roller 36 and the idle contrast roller 37. In this case, moreover, the drawing unit 15 is configured to feed to the machine 12 simultaneously or independently from each other, three bars 11 that are retained by one of the feed heads 13. To this purpose the motorized roller 36 is provided with three grooves 50.

The first auxiliary roller 51 is provided on its external surface with a groove 50 identical to those present on the motorized roller 36.

The first auxiliary roller 51 and respectively the second auxiliary roller 52 are disposed distanced by a determinate distance H from the motorized roller 36 and respectively from the idle contrast roller 37 by means of a segment of pin 55 with a length at least equal to double the distance between one bar 11 and the next one. The segment of pin 55 of the first auxiliary roller 51 is keyed to the rotation shaft 57 of the motorized roller 36 so that the drive of the motor 45 determines the solid rotation of the latter and also of the first auxiliary roller 51.

In this way, the first auxiliary roller 51 and the second auxiliary roller 52 can be translated in the first direction Z to move any one of the bars 11 fed by a feed head 13.

The apparatus to feed bars according to the present invention functions as follows.

A plurality of bars 11 are conveyed by conveyor means, not shown in the drawings, toward the feed apparatus 10, and in particular toward the feed heads 13.

At each feed head 13 may arrive one, two or more bars 11 having shapes and cross section sizes similar to or different from each other.

The bars 11 relating to one of the feed heads 13 are inserted through the respective passage channels 14 and through the through holes 21 of the plate 19.

Each of the bars 11 is therefore interposed in the space comprised between the feed heads 13 and the plates 19, in which the drawing unit 15 acts.

Depending on the final product that is to be obtained, the support body 16 is selectively moved in the transverse direction D to selectively position one of the feed heads 13 that carries the bars 11 in correspondence with the entrance to the machine 12, that is, positioning the passage channels 14 and the through holes 21 substantially aligned in the direction of feed X.

In this condition, the drawing unit 15 that is in its first operating condition retracted with respect to the feed plane is translated in the first direction Z to take it to the second operating condition in which the bars 11 are comprised between the motorized roller 36 and the idle contrast roller 37.

In the second operating condition, depending on the position assumed by the motorized roller 36, it may be provided to feed forward either all the bars 11 of the feed head 13, or any one of them whatsoever.

In this way, the drawing unit 15 feeds one or more bars 11 to the machine 12, or to a drawing unit 60 and to work members 61 to make the final products.

It is clear that modifications and/or additions of parts may be made to the apparatus to feed metal products as described heretofore, without departing from the field and scope of the present invention.

The invention claimed is:

1. An apparatus to feed metal products to a work machine comprising a plurality of feed heads disposed during use upstream of said work machine, each feed head of said plurality of feed heads supporting a plurality of metal products, and at least one feed head being configured to retain at least two metal products and render the at least two metal products selectively available to said work machine, wherein the apparatus comprises a drawing unit interposed during use between said plurality of feed heads and said work machine, said drawing unit being configured to assume at least a first operating condition not interfering with said plurality of metal products, and a second operating condition in which said drawing unit is positioned during use in axis with the work axis of said work machine and is configured to pick up from said at least one feed head at least one of said plurality of metal products chosen from among the at least two metal products retained by the at least one feed head and to feed the at least one metal product to said work machine in a direction of feed, said plurality of feed heads being movable during use with respect to the drawing unit in a direction transverse with respect to said direction of feed.

2. An apparatus as in claim 1, wherein said drawing unit is associated with a slider selectively translatable in a first direction transverse to the direction of feed of said at least one metal product so as to take said drawing unit to said first and second operating condition.

3. An apparatus as in claim 2, wherein said drawing unit comprises a motorized roller and a contrast roller associated with said slider, and wherein one of either said motorized roller or said contrast roller is selectively movable toward the other so as to exert a contrasting action on at least one of said plurality of metal products.

4. An apparatus as in claim 3, wherein between said slider and at least one of either said motorized roller or said contrast roller an interspace is defined, configured to prevent, in said second operating condition, at least one of said at least two metal products from interfering with the drawing unit.

5. An apparatus as in claim 4, wherein said motorized roller and/or said contrast roller are mounted cantilevered on a respective rotation shaft and on a pin suitable to define said interspace.

6. An apparatus as in claim 5, wherein said drawing unit comprises at least a first auxiliary roller keyed and coaxial to said motorized roller, and a second auxiliary roller disposed coaxial to said contrast roller, said first auxiliary roller and second auxiliary roller being disposed distanced axially by a determinate distance with respect to said motorized roller and contrast roller.

7. An apparatus as in claim 3, wherein said drawing unit comprises at least a first auxiliary roller keyed and coaxial to said motorized roller, and a second auxiliary roller disposed coaxial to said contrast roller, said first auxiliary roller and second auxiliary roller being disposed distanced axially by a determinate distance with respect to said motorized roller and contrast roller.

8. An apparatus as in claim 7, wherein said first auxiliary roller and said second auxiliary roller are disposed externally with respect to said motorized roller and said contrast roller.

9. An apparatus as in claim 7, wherein said distance is at least equal to double the distance between said at least two metal products.

10. The apparatus according to claim 1, wherein the apparatus comprises a work machine selected from the group comprising a bending machine, a shaping machine, and a stirrup-making machine.

\* \* \* \* \*